United States Patent [19]
Oku

[11] Patent Number: 5,386,252
[45] Date of Patent: Jan. 31, 1995

[54] PROJECTION SYSTEM AND DISPLAY APPARATUS FOR COMPRESSING AND EXPANDING ASPECT RATIO OF A PICTURE

[75] Inventor: Kentaro Oku, Mobara, Japan

[73] Assignee: Hitachi, Ltd., Tokyo, Japan

[21] Appl. No.: 873,011

[22] Filed: Apr. 24, 1992

[30] Foreign Application Priority Data

Aug. 27, 1991 [JP] Japan ................... 3-215032

[51] Int. Cl.⁶ .................... H04N 5/74; H04N 9/31
[52] U.S. Cl. ................... 348/746; 348/751; 359/454; 359/670
[58] Field of Search ............... 358/60–64, 358/74, 230, 231, 236, 237; H04N 5/74, 9/31; 359/670, 443, 453–454, 456, 460; 353/31–34, 48; 348/740, 744, 747, 751, 792, 746

[56] References Cited
FOREIGN PATENT DOCUMENTS

| | | | |
|---|---|---|---|
| 90628 | 11/1973 | Japan . | |
| 561 | 5/1979 | Japan | H04N 5/74 |
| 194234 | 11/1983 | Japan | H01J 31/10 |
| 86682 | 3/1989 | Japan | H04N 5/74 |
| 48881 | 2/1990 | Japan | H04N 5/74 |
| 185177 | 7/1990 | Japan | H04N 5/74 |
| 8700058 | 8/1988 | Netherlands . | |

Primary Examiner—James J. Groody
Assistant Examiner—Glenton B. Burgess
Attorney, Agent, or Firm—Antonelli, Terry, Stout & Kraus

[57] ABSTRACT

A projection system for pictures and a projection display apparatus which are designed to improve the luminance and contrast of a magnified picture on a projection screen by increasing the luminous flux projected within the effective size of projection optical systems. The projection display apparatus has a picture compression device for compressing the aspect ratio of the source picture formed on the face plate panel (PNL) of a projection cathode-ray tube (PRT) or a liquid crystal panel (LCP) to make it substantially 1 and an optical system for extending a picture (EXT) for extending the source picture having the same aspect ratio as that of the original picture. With this construction, the whole luminous flux passing the effective size of the projection optical system is maximized with the effect of improving the luminance and contrast of the magnified pictured projected onto the projection screen.

12 Claims, 10 Drawing Sheets

PROJECTION SYSTEM AND DISPLAY APPARATUS FOR COMPRESSING AND EXPANDING ASPECT RATIO OF A PICTURE

BACKGROUND OF THE INVENTION

The present invention relates generally to projection systems for pictures and projection display apparatus, and more particularly to a projection system for pictures which is capable of improving the luminance and contrast of the magnified picture projected onto a projection screen and a projection display apparatus therefor.

A conventional projection display apparatus of the sort described above is constructed so that the source picture formed on the face plate panel of a projection cathode-ray tube or a liquid crystal panel is projected onto a projection screen by means of an optical system for magnifying whose magnifications in both horizontal and vertical directions are equal.

In the projection display apparatus using such a projection cathode-ray tube, the face plate panel is bombarded with an electron beam having a great current to form a source picture and the magnifying projection optical system is used to project the source picture onto the projection screen.

In order to intensify the luminance and contrast of the picture projected onto the screen by strengthening the luminance of tile source picture formed on the face plate panel, a current density needs increasing while the spot size of the electron beam for use in forming the source picture is decreased as disclosed in Japanese Patent Laid-Open No. 561/1979, however, the temperature of the face plate panel is caused to rise because of the bombardment of the electron beam at the large current and this results in reducing the light emission efficiency of the fluorescent material and consequently reducing the luminarice and contrast of the magnified picture projected onto the projection screen. Moreover, the projection cathode-ray tube and the magnifying projection optical system, when positioned close to each other, may admit of reflection of light therebetween, thus allowing a reduction in the luminance and contrast of the picture in the screen likewise.

Attempts have been made to solve the foregoing problems; ill the case of the former problem, for instance, Japanese Patent Laid-Open No. 90628/1973 discloses the provision of a cooling construction for a face plate panel so as to prevent its temperature from rising.

As what was intended to solve the latter problem, moreover, Japanese Patent Laid-Open No. 194234/1983 discloses the provision of a reflection preventive medium between a face plate panel and an optical system.

Further, the Television Society Journal 'Projection Large Screen Display', pp 164-, Feb. 1991, for instance, may be quoted as what discloses a general system configuration relative to a projection display of the sort stated above.

When the prior art projection cathode-ray tube is used to deal with a picture whose vertical length is different from horizontal length, particularly when a picture like a high-vision picture having an extremely high aspect ratio of a horizontal to vertical ratio is referred as "an aspect ratio" is projected, the source picture generated on the face plate panel of the projection cathode-ray tube becomes oblong.

As the source picture formed on the face plate panel is restricted by the size of its long side (generally the size in the horizontal or lateral direction), an area of the picture within the (effective) size that can be covered by a projection optical system relatively decreases for higher aspect ratio and this results in reducing the luminance and contrast of the picture projected onto a projection screen as the whole luminous flux on the screen abates. This problem arises not only when the projection cathode-ray tube is used as a means for generating the source picture but also when a means for generating a picture such as a liquid crystal panel is employed.

SUMMARY OF THE INVENTION

An object of the present invention is to provide a projection system for pictures which is capable of improving the luminance and contrast of the picture projected onto a projection screen by making as large as possible an area of a source picture to be covered by the effective size of a projection optical system and increasing the whole luminous flux on the projection screen while keeping constant the size that can be covered by the projection of the projection optical system, and a projection display apparatus therefor.

In order to accomplish the object by means of the projection display apparatus using projection cathode-ray tubes or liquid crystal panels according to the present invention, an oblong picture having four straight sides, shorter or longer in the vertical direction than in the horizontal direction (the aspect ratio being 4:3 for the standard television system; and 16:9 for the high-vision system) is reduced in such a way that the aspect ratio becomes equalized or substantially equalized so that the picture is projected onto the face plate panel of the cathode-ray tube or onto a means for generating a source picture such as a liquid crystal panel. The source picture is magnified by the projection optical system to the original picture frame size (at the original aspect ratio) in order for the picture to be projected onto the projection screen. This system described above has been implemented into a projection display apparatus.

In the projection display apparatus using projection cathode-ray tubes, the shape of an electron beam spot on the face plate panel should preferably be oval in that the source picture is longer in a direction in which the compression ratio is small (generally in the vertical direction). In the projection display apparatus using a panel type display element such as a liquid crystal display element (hereinafter called a liquid crystal panel), on the other hand, the liquid crystal panel should preferably be rectangular in that the shape of a pixel on the liquid crystal panel is longer in the vertical direction (a direction in which the compression ratio is small). Moreover, a source picture to be formed on the face plate panel of the cathode-ray tube or the liquid crystal panel should preferably be square substantially at an aspect ratio of 1.

The ratio of the horizontal length to the vertical length of the oval electron beam spot on the projection cathode-ray tube or of the rectangular cell on the liquid crystal panel on which the source picture is formed should preferably be set so that the above ratio conforms to the ratio of the vertical length to the horizontal length of the original picture.

More specifically, in a projection system for pictures which comprises means for generating source pictures, projection optical systems and projection means, and is used for projecting onto the projection means the magnified source picture formed on the means for generating source pictures by means of the projection optical systems according to the present invention, the source picture is formed on means for generating a source picture with the aspect ratio of the original picture as what is made different so as to conform substantially to an aspect ratio of 1 and the source picture thus formed is projected onto the projection means after being magnified by the projection optical system to the aspect ratio of the original picture. A projection display apparatus comprising the projection cathode-ray tubes having face plate panels, the projection optical systems for projecting the magnified source pictures formed on the face plate panels of the projection cathode-ray tubes and the projection screen, is characterized by a picture compression means for forming the source picture on the face plate panel of the projection cathode-ray tube with the aspect ratio of the original picture as what is made different so as to conform substantially to an aspect ratio of 1 and optical systems for extending pictures which are used for projecting on the projection screen the source pictures formed on the face plate panels with the source picture formed thereon as the aspect ratio of the original picture. The optical system for extending a picture is made an optical lens provided on the projection screen side of the projection optical system or otherwise a convex mirror provided between the projection optical system and the projection screen.

The shape of the electron beam spot on the face plate panel is compressed at a compression ratio corresponding to the compression ratio in the direction of compression of the original picture.

A projection display apparatus comprising a light source lamp, liquid crystal panels having each a number of pixel cells in the form of a matrix, projection optical systems for projecting the magnified source pictures formed on the liquid crystal panels and a projection screen, further comprises according to the present invention a picture compression means for forming the source picture on the liquid crystal panel with the aspect ratio of the original picture as what is made different so as to conform substantially to an aspect ratio of 1 and an optical system for extending a picture which is used for projecting on the projection screen the source picture formed on the face plate panel with the source picture formed on the liquid crystal panel as the aspect ratio of the original picture. Each of the pixel cells constituting the liquid crystal panel is compressed into a shape at a compression ratio corresponding to the compression ratio in the direction of compression of the original picture.

As the aspect ratio (the ratio of the horizontal size to the vertical size) of the picture formed by the means for generating a source picture is set substantially at 1, the area of a rectangular picture internally touching the effective circumference of a circular projection optical system is maximized. Therefore, the whole luminous flux projected on the projection screen has a maximum value, whereby the luminance and contrast of the picture on the projection screen are improved.

Moreover, as the electron beam spot on the face plate panel of the projection cathode-ray tube is compressed into a (e.g., vertically long oval) shape in the same direction as that of compression of the size of the original picture or as the pixel cell on the liquid crystal panel is compressed into a (e.g., vertically long rectangular) shape in the same direction as that of compression of the size of the original picture, it may be extended by the optical system for extending a picture to the original aspect ratio. Consequently, the balance between the horizontal and vertical resolutions of the magnified picture projected on the projection screen can be maintained satisfactorily.

DESCRIPTION OF THE PREFERRED EMBODIMENT

Referring to the accompanying drawings, embodiments of the present invention will subsequently be described in detail. In the accompanying drawings, reference characters denote the following:

rPRT ... projection cathode-ray tube for red, gPRT ... projection cathode-ray tube for green, bPRT ... projection cathode-ray tube for blue, PNL ... panel (face plate panel), CMP ... picture compression means, LNS ... projection lens, EXT ... optical system for horizontal magnifying, CPL ... coupler, EXTM ... mirror for horizontal magnifying, Lh ... horizontal length of picture, Lv ... vertical length of picture, D ... diagonal size of picture, BM,BM' ... shape of electron beam spot on face plate panel, dh ... horizontal size of electron beam, dv ... vertical size of electron beam, x ... horizontal direction, y ... vertical direction, z ... direction of optical axis, M ... mirror, DM ... dichroic mirror, DP ... dichroic prism, LCP ... liquid crystal panel, LM ... lamp, CL ... condenser lens, C,C'

... pixel cell, ah ... horizontal length of pixel cell, av ... vertical length of pixel cell, 1 ... projection screen, 2 ... mirror.

A projection system for pictures is generally so constructed that it employs projection cathode-ray tubes, projection liquid crystal panels or the like as means for generating pictures, arranges to position the means for generating pictures with a predetermined distance apart from a projection screen, and uses optical systems for magnifying source pictures formed on the respective means for generating pictures and projecting them on the projection screen.

Figure 11:
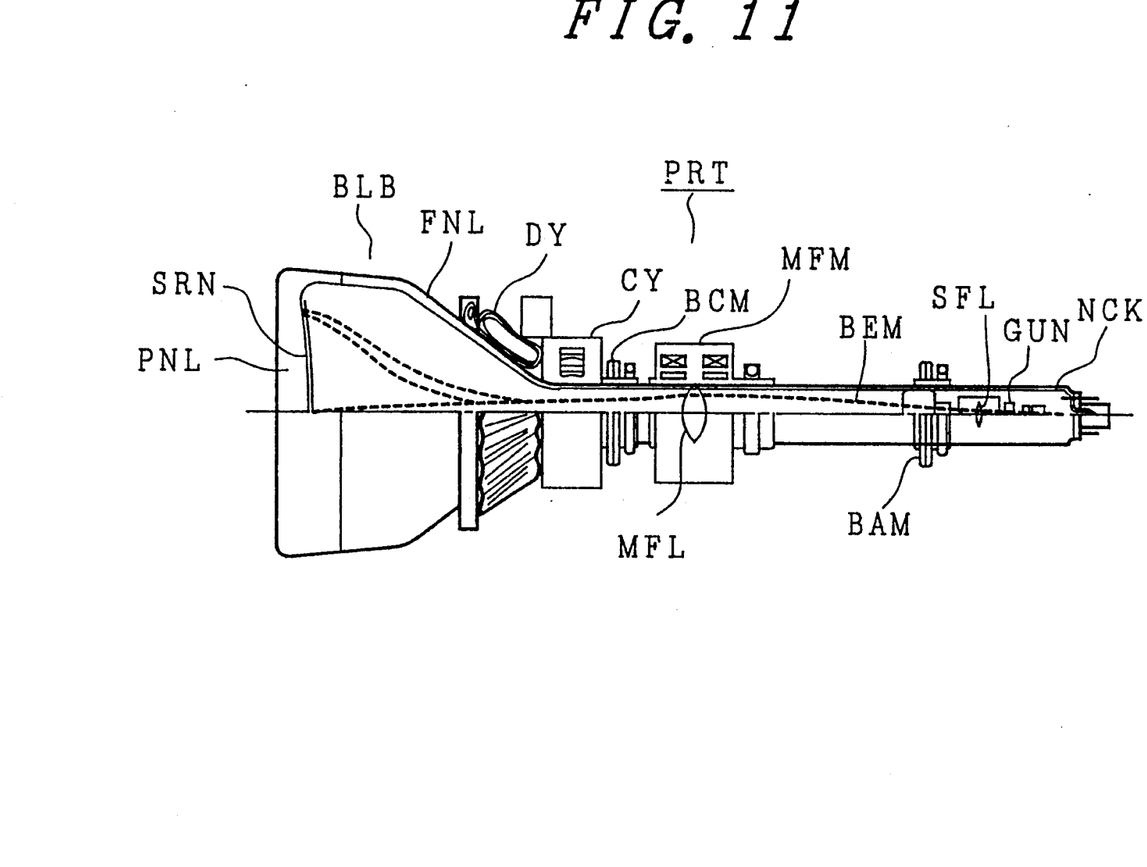
FIG. 11 is a partial sectional view illustrative of the construction of a projection cathode-ray tube for use in the present invention.

FIG. 11 is a partial sectional view illustrative of the construction of a projection cathode-ray tube for use in an embodiment of the present invention and particularly of a projection cathode-ray tube of a composite condensing type which simultaneously uses an electromagnetic lens and an electrostatic lens.

As shown in FIG. 11, an electron gun GUN for emitting, controlling, accelerating and condensing electron beams BEM is accommodated in the neck portion NCK of a glass bulb BLB and a monochromatic face plate panel SRN is deposited and formed on the inner face in the panel portion PNL, that is, on the front surface of the glass bulb BLB. The projection cathode-ray tube PRT is thus constructed.

A deflection yoke DY for deflecting the electron beams BEM emitted from the electron gun GUN in the horizontal and vertical directions is fitted to the circumference of the funnel portion FNL of the glass bulb BLB to make the whole face plate panel SRN luminous. Moreover, a convergence yoke CY for correcting the misconvergence of the picture sequentially reproduced in the projection cathode-ray tube PRT for each color, a centering magnet BCM for regulating the free spot position of the electron beam BEM, and a focus magnetic MFM for forming an electromagnetic lens MFL for condensing the electron beams BEM are fitted to a position adjacent to the deck side of the deflection yoke DY.

In addition, a beam alignment magnet BAM for correcting the center axis of the electromagnetic lens MFL formed by the focus magnet MFM and the passage axis of the electron beam BEM is fitted to the outer periphery of the neck portion in which the electron gun GUN is accommodated.

The aspect ratio of the source picture formed on the face plate panel of the projection cathode-ray tube can be set as desired by the deflection waveform applied to the deflection yoke DY or a picture signal processing circuit.

Further, the shape of the electron beam spot on the face plate panel can be controlled by controlling the construction of the electrodes of the electron gun, the electromagnetic field or magnetic field to be applied.

Although the mainstream of use is for existing projection display apparatus to be equipped with the projection cathode-ray tubes PRT, those which employ liquid crystal display panels in place of such cathode-ray tubes as means for generating source pictures have also recently been put to practical use.

The aspect ratio of the source picture formed on the liquid crystal panel may structurally be set as that of the liquid crystal cell of the liquid crystal panel itself.

A detailed description will subsequently be given of each embodiment of the present invention in the form of what employs the projection cathode-ray tubes and the liquid crystal panels as means for generating source pictures.

Figure 1:
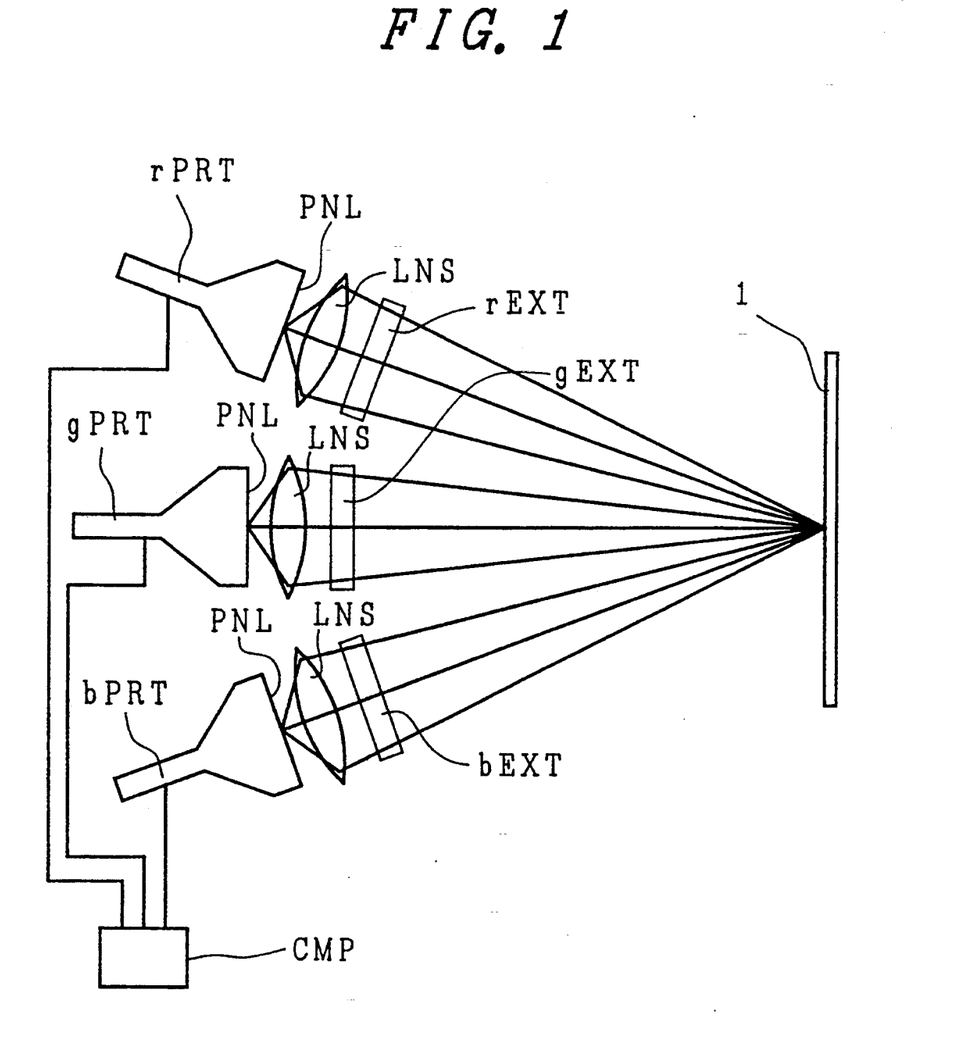
FIG. 1 is an optical system configuration illustrating a projection system for pictures and a projection display apparatus as a first embodiment of the present invention.

FIG. 1 is an arrangement plan of an optical system with a projection system for pictures and a projection display apparatus as a first embodiment of the present invention.

In FIG. 1, rPRT denotes a projection cathode-ray tube for red, gPRT a projection cathode-ray tube for green, and bPRT a projection cathode-ray tube for blue. A projection screen 1 is disposed on the center axis of the projection cathode-ray tube for green gPRT opposite to a face plate panel PNL with a predetermined distance apart therefrom.

There are also installed projection optical systems, that is, projection lens systems LNS in front of the respective face plate panels PNL of and along the respective center axes of the projection cathode-ray tubes rPRT, gPRT, bPRT. Each of the monochromatic pictures (r: red, g: green, b: blue) formed on the face plate panels PNL of the projection cathode-ray tubes rPRT, gPRT, bPRT are condensed and magnified by the respective projection lens systems LNS before being projected onto the projection screen. The three colors are synthesized and superposed on the screen to provide a color picture.

In FIG. 1, a picture compression means CMP is used for compressing an original picture on the face plate panel in such a way that the aspect ratio (the ratio of the vertical size to the horizontal size) of the picture substantially becomes 1. Systems for horizontal magnifying rEXT, gEXT, bEXT as optical systems for extending pictures constitute means for extending the source pictures formed on the face plate panels PNL in the horizontal direction to make each source picture what has the size of the original picture.

With this projection display apparatus thus constructed, it is possible to make reproducible a picture having size, luminance and contrast far greater than those attainable from an imaging apparatus such as a direct viewing television.

As an example of the projection display apparatus, a home projection television of the sort described above is now widely in use. However, such a television set is desired to be made more compact (thinner) as the picture offered is large in size.

Figure 2:
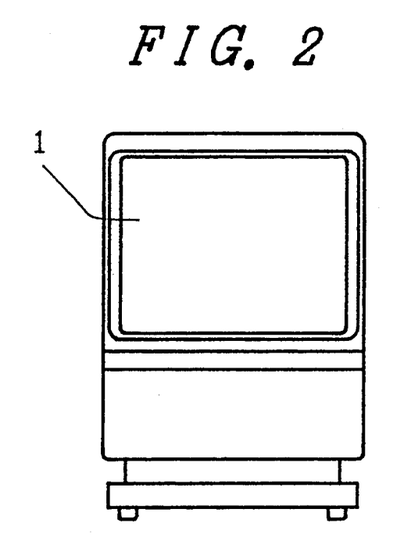
FIG. 2 is a schematic elevational view of an exemplary back projection television receiver incorporating a projection cathode-ray tube according to the present invention.
Figure 3:
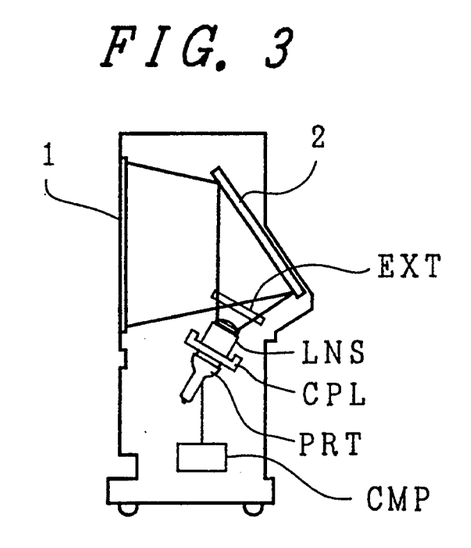
FIG. 3 is a schematic sectional side elevation of the back projection television receiver shown in FIG. 2.

FIG. 2 is a schematic elevational view of an exemplary back projection television receiver (hereinafter simply called 'back projection television') incorporating projection cathode-ray tubes and FIG. 3 is a schematic sectional side view of FIG. 2.

In FIG. 3, the projection lenses LNS are coupled via the respective couplers CPL to the projection cathode-ray tubes PRT (rPRT, gPRT and bPRT) and disposed in the lower portion of the television set. Pictures reproduced from the projection cathode-ray tubes PRT are condensed and magnified via the projection lenses LNS, EXT (rEXT, gEXT, bEXT). These pictures thus magnified and reproduced are reflected from a mirror 2 disposed at an appropriate angle in the upper portion of the television set, so that a projection picture is obtained on the projection screen.

Figure 4:
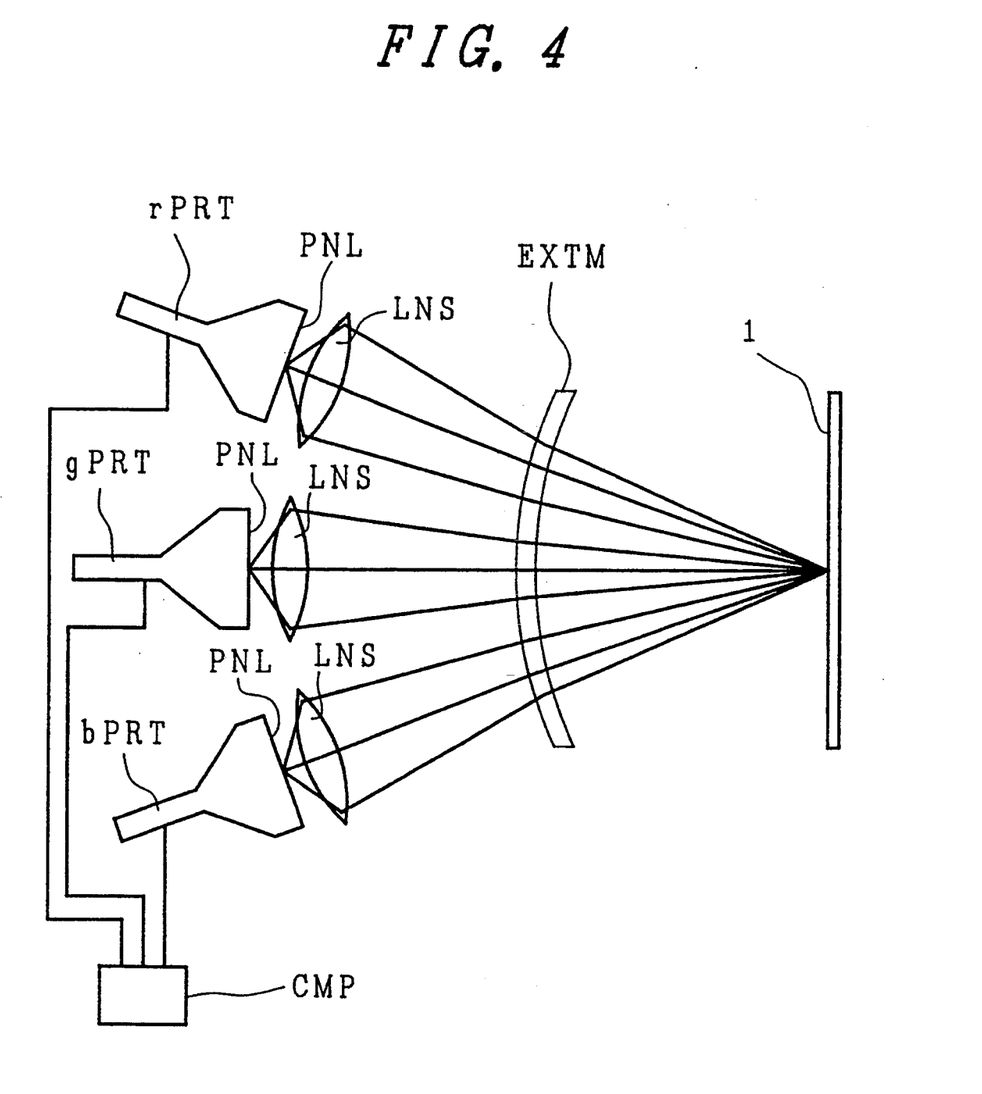
FIG. 4 is a Top view of the principal part of a color picture projection apparatus using a projection cathode-ray tube as a second embodiment of the present invention.

FIG. 4 is a side view of the principal part of a color picture projection apparatus using projection cathode-ray tubes as a second embodiment of the present invention.

In FIG. 4, like reference characters correspond like component parts of FIG. 1, wherein EXTM represents an optical system (optical system for extending pictures)

as another means for horizontally extending pictures that features the present invention.

In this embodiment, use is made of a mirror EXTM having a convex mirror face in the horizontal direction in place of the optical systems EXT in the preceding embodiment.

Figure 5:
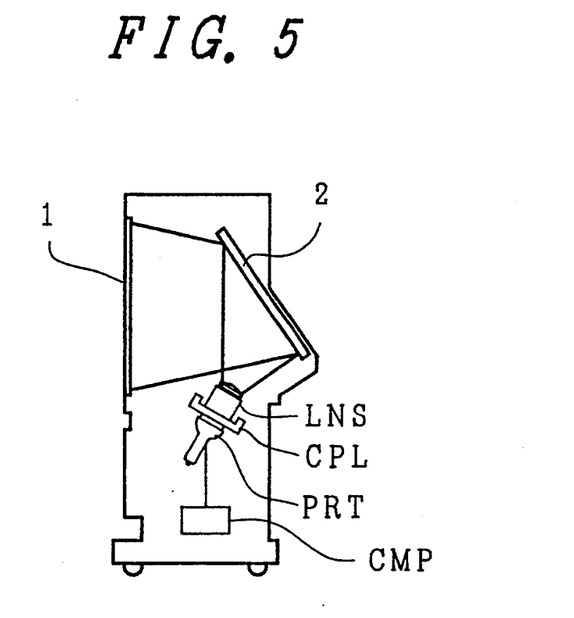
FIG. 5 is a schematic sectional side elevation of a back projection television which is similar to what is shown in FIG. 3 and has the construction of FIG. 4.

FIG. 5 is a schematic sectional side view of a back projection television which is similar to what is shown in FIG. 3 and has the construction of FIG. 4.

In FIG. 5, one mirror EXTM having a convex mirror face in the horizontal direction is used to replace the three EXT (though consisting of three of rEXT, gEXT, bEXT, only one EXT is shown in FIG. 3, since FIG. 3 is a sectional side view of FIG. 2). Even with this construction, it is possible to form an optical system for horizontally extending pictures (i.e., an optical system for extending pictures).

The television which incorporates the projection cathode-ray tubes utilizing the back projection as described above is advantageous in that it can be made compact since the projection distance is shortened with the effect of reducing the depth of the television set.

Figure 6A:
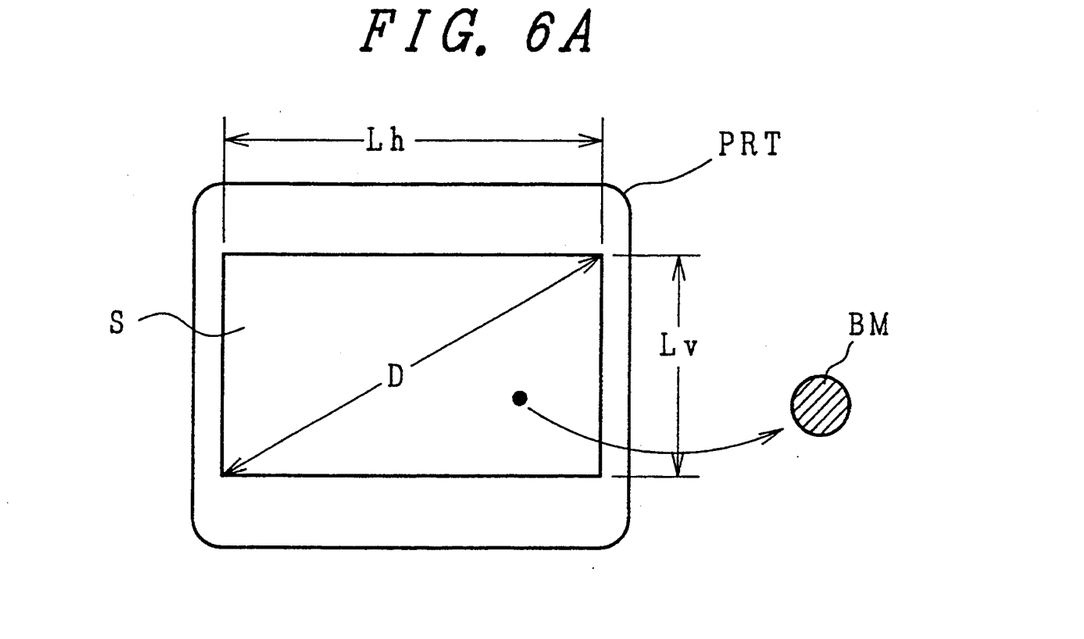
FIGS. 6A and 6B are diagrams illustrating the size of each source picture formed on the face plate panel of a projection cathode-ray tube and the shape of each electron beam spot in the central part of the screen.
Figure 6B:
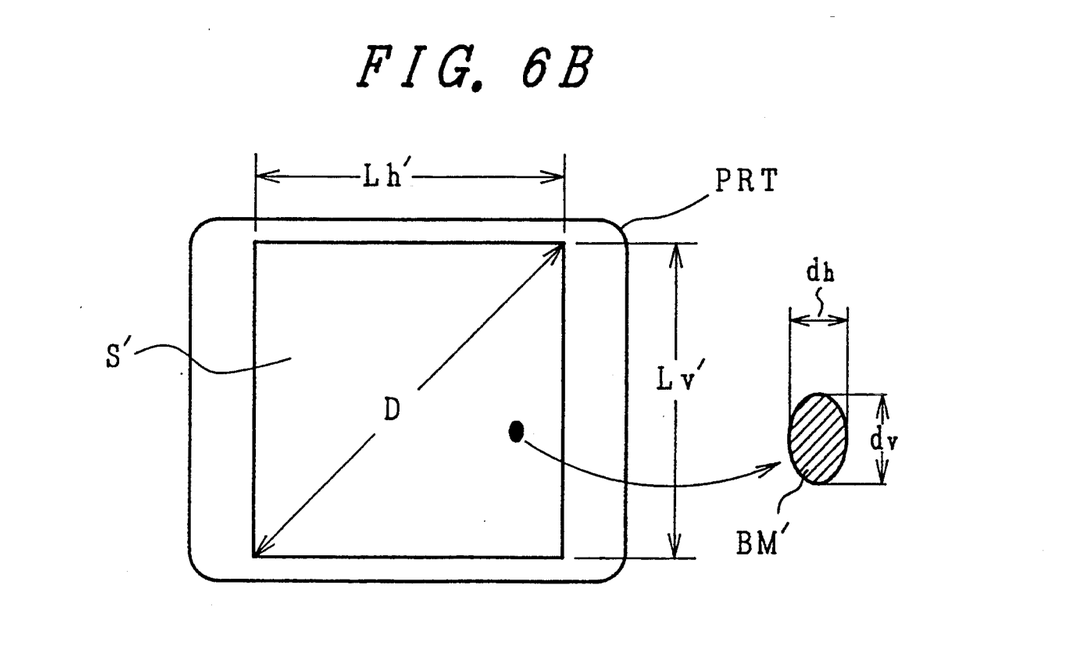

FIGS. 6A and 6B are diagrams illustrating the size of each source picture formed on the face plate panel of a projection cathode-ray tube and the shape of each electron beam spot in the central part of the screen: 6A illustrates the source picture formed on the face plate panel of the projection cathode-ray tube in the prior art and the beam spot configuration at the center of the screen; 6B the source picture formed on the face plate panel of the projection cathode-ray tube under the system according to the present invention and the beam spot configuration at the center of the screen.

Assuming the projection lenses in FIGS. 6A and 6B are similar, the diagonal sizes of the pictures that can be projected thereby become equal. The ratio of the width to the height of the picture in the standard television system differs from the ratio in the high-vision system; namely, the ratio of the width Lh to the height Lv in the former is 4:3, whereas the ratio of the width Lh' to the height Lv' in the latter is 16:9.

In the prior art projection optical systems, the source picture shown in FIG. 6A is projected onto the projection screen at an equal magnification in the horizontal direction (in the direction of width) and in the vertical direction (in the direction of height LV). In the projection system according to the present invention, on the other hand, the ratio of the height Lh' to the width Lv' is substantially 1 as shown in FIG. 6B. In the prior art projection optical system, since the picture compressed in the horizontal direction is formed on the face plate panel before being projected onto the projection screen, the picture projected thereon is compressed in the horizontal direction.

In this embodiment of the present invention, the source picture formed on the face plate panel of the projection cathode-ray tube is projected onto the screen in such a way that the horizontal size is extended by EXT or EXTM to an extent greater than what is applicable to the vertical direction to make its dimensions proportionally equal to those of the original.

As shown in FIG. 6A, moreover, though the electron beam spot on the face plate panel is set circular in the prior art, it is made vertically long oval in proportion to the compression ratio of the picture in the embodiment of the present invention as shown in FIG. 6B. When there is formed a high-vision picture on the face plate panel with the height Lb' and the width Lv' being equal to each other, for instance, it is preferred to make oval the cathode-ray spot on the face plate panel with the ratio of the vertical length to the horizontal length thereof (dv/dh) set at 16:9.

In this case, an area S of a picture display portion is given by $$S(a) = Lh \times Lv = a/(1+a^2) \times D^2 \qquad (1)$$

where D = size in the diagonal direction; and a = ratio of the height to the width of the picture.

When a square picture with a = 1 and a high-vision picture with a = 9/16 are compared on condition that both diagonal sizes D are equal, for instance, $$S(1)/S(9/16) = 1.17 \qquad (2)$$

In other words, the horizontal compression of the picture is seen to increase by approximately 17% the quantity of light that can be projected with the same projection lens diameter in the high-vision system as shown in FIG. 6B. Even with the addition of the optical system for horizontal magnifying, that is, the optical system for extending pictures EXT (FIG. 1) as will be described below allows for about 4% of the quantity of light to be lost at most, the quantity of light can be increased by over 13%. Moreover, the quantity of light may be reduced to the least when EXTM (FIG. 4) is employed.

In the case of FIG. 6B, not only the horizontal length but also the deflection power needed for the horizontal deflection can be reduced by a large margin as compared with what is shown in FIG. 6A. As the power needed for the horizontal deflection is generally far greater than what is needed for the vertical deflection, the system shown in FIG. 6B according to the present invention has the secondary effect of reducing power consumption necessary for deflection.

Figure 7:
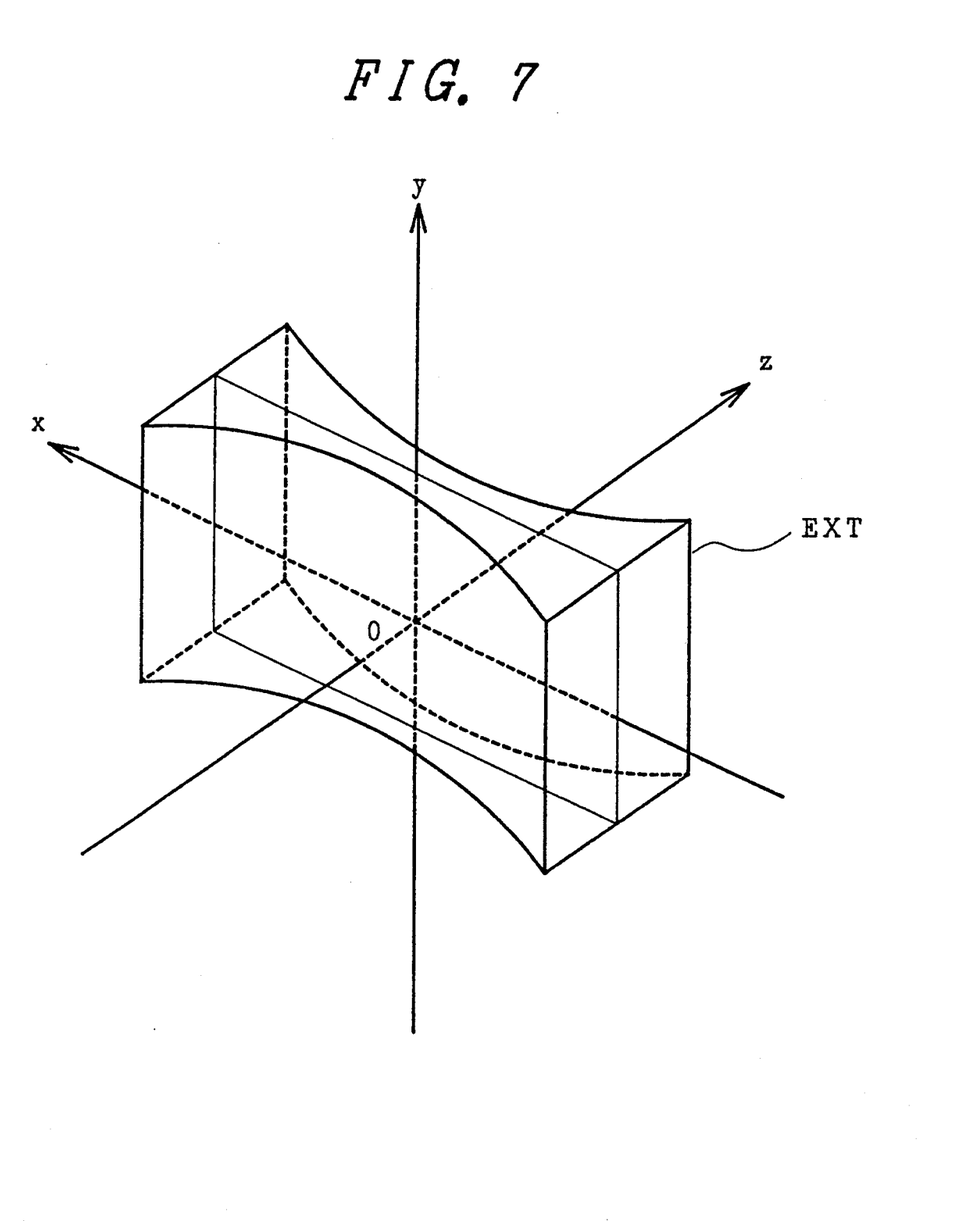
FIG. 7 is a schematic perspective view of an exemplary optical system for horizontal magnifying EXT as the optical system for extending a picture shown in FIG. 1.

FIG. 7 is a schematic perspective view of an exemplary optical system for horizontal magnifying EXT as the optical system for extending a picture as shown in FIG. 1.

In FIG. 7, x, y and z respectively represent the horizontal and vertical scanning directions and the optical axis of a projection cathode-ray tube. The optical system for magnifying is made of glass or plastics and its thickness in the direction of z remains constant without relying on the direction of y and is set so that it becomes greater as the absolute value of x increases. In other words, the optical system is such a lens as made concave in only the horizontal direction (x). The source picture compressed and formed by the optical system for magnifying in the horizontal direction on the face plate panel of each PRT (rPRT, gPRT, bPRT) is extended in the horizontal direction in order for a magnified picture having the same aspect ratio as that of the original picture to be obtained on the screen.

Although the electron beam spot on the face plate panel is vertically long oval in shape, it becomes circular when it is projected by the optical system for horizontal magnifying onto the screen, whereby a picture having resolution well balanced vertically and horizontally can be displayed.

In the back projection display having the mirror shown in FIG. 3, it is possible to obtain the same effect as what is achievable from the optical mirror for magnifying which has the convex mirror in the horizontal direction as shown in FIG. 5.

Moreover, it is also possible to obtain the same effect from the combination of the optical lens for magnifying of FIG. 7 and the optical mirror for magnifying of FIG. 4.

The embodiments described above refer to a case where the present invention has been applied to the cathode-ray projection display. A description will subsequently be given of an application of the present invention to a liquid crystal projection display.

To put it simply, the liquid crystal display is equivalent to what has replaced a film for a slide projector with a sheet of liquid crystal panel. In view of resolution as well as brightness, the mainstream of use is directed to a projection display apparatus using three liquid crystal panels corresponding to red, green and blue.

Figure 8:
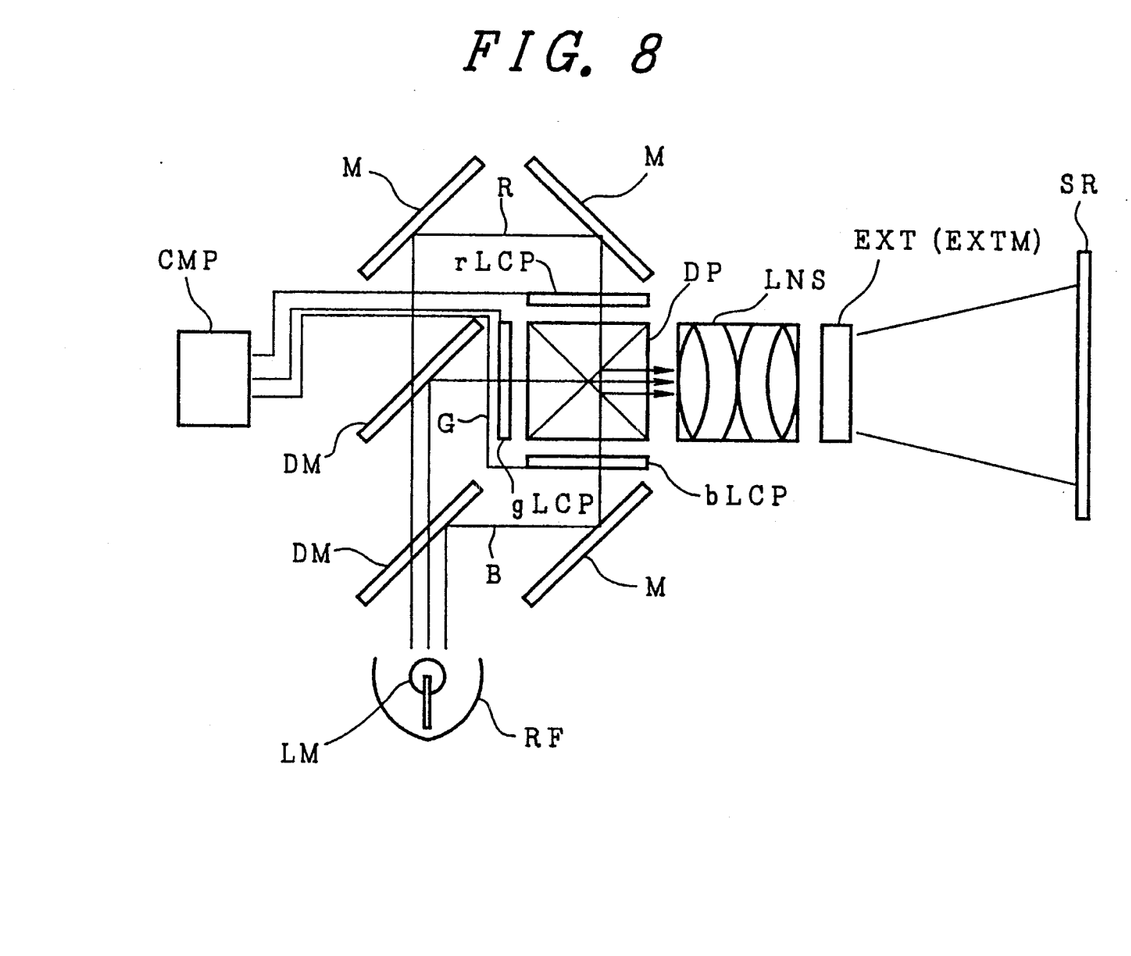
FIG. 8 is a diagram illustrating an exemplary overall optical system as a third embodiment of the present invention.
Figure 9:
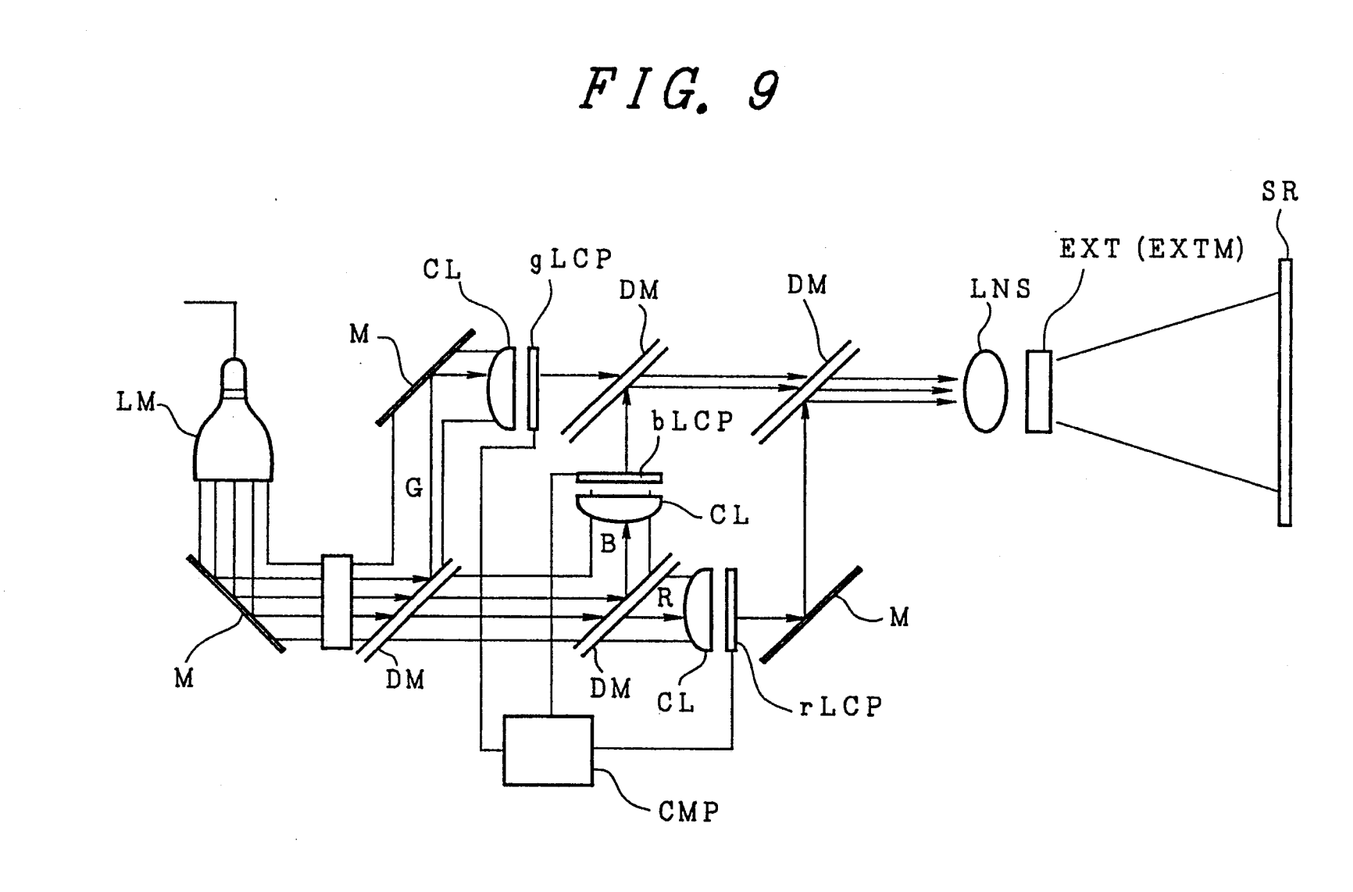
FIG. 9 is a diagram illustrating an exemplary overall optical system as a fourth embodiment of the present invention.

FIG. 8 is a diagram illustrating an exemplary overall optical system as a third embodiment of the present invention. FIG. 9 is a diagram illustrating an exemplary overall optical system as a fourth embodiment of the present invention.

In these embodiments, liquid crystal projection display apparatus are basically of construction similar to each other as shown in FIGS. 8 and 9. Each optical system comprises:

white light source—trichromatic separation system—trichromatic liquid crystal panel—trichromatic synthesizing system—projection lens—optical system for extending a picture—projection screen, wherein LM denotes a lamp, RF a reflection mirror, DM dichroic mirrors, M reflection mirrors, CL a condenser lens, LCP liquid crystal panels, DP a synthesizing prism, LNS a projection lens, EXT an optical system for extending, SR a screen, CMP a picture compression means for generating pictures on liquid crystal panels with an aspect ratio of substantially 1.

In this system shown in FIG. 8, white light from the light source M is separated by the dichroic mirrors into the three primary colors R (red), G (green), B (blue). The picture compression means CMP forms source pictures of three primary colors on the liquid crystal panels LCP (rLCP, gLCP, bLCP) with an aspect ratio of substantially 1. The white light thus separated is made incident on the respective LCP (rLCP, gLCP, bLCP) for modulation and subjected to three color synthesization in the synthesizing prism DP. The picture thus synthesized is then projected by the projection lens LNS and the optical system for extending a picture EXT on the screen SR as a picture of original size.

In FIG. 8, EXTM of FIG. 4 in place of EXT may be used.

FIG. 9 refers to a case where the dichroic mirrors DM in place of the synthesizing prism of FIG. 8 are used and similarly EXTM in place of EXT is used as the optical system for extending a picture.

Figure 10A:
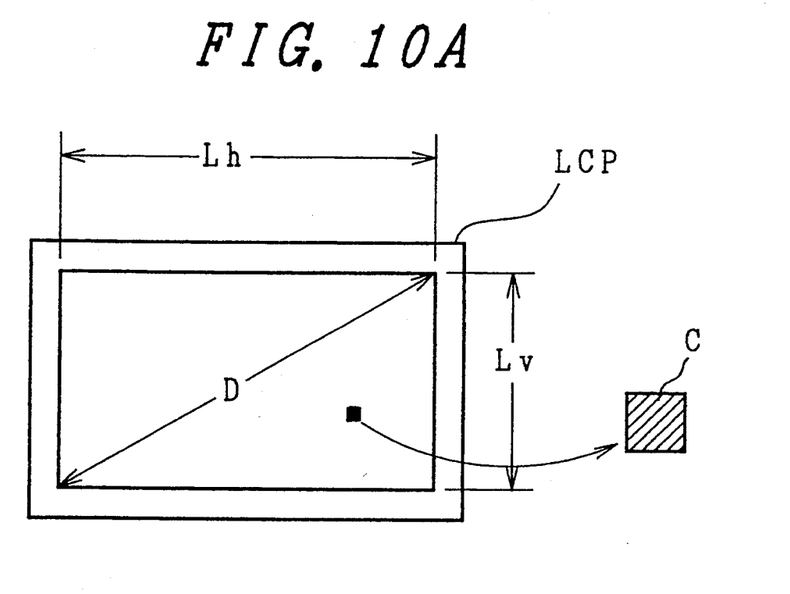
FIGS. 10A and 10B are diagrams illustrating the size of each liquid crystal panel for use in forming a source picture and the shape of each pixel cell.
Figure 10B:
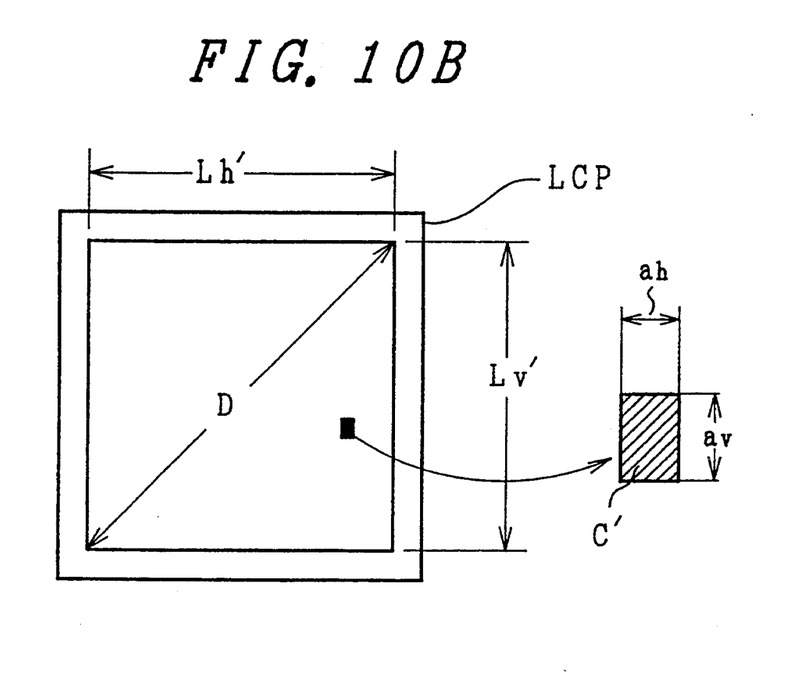

FIGS. 10A and 10B are diagrams illustrating the size of each liquid crystal panel for use in forming a source picture and the shape of each pixel cell: FIG. 10A illustrates the prior art liquid crystal panel and the pixel cell; and FIG. 10B illustrates a liquid crystal panel embodying the present invention and the pixel cell.

As shown in FIG. 10A, the ratio of the width (in the horizontal direction) Lh and the height (in the vertical direction) Lv of the source pictured formed on the liquid crystal panel in the standard television system is 4:3 and the ratio thereof in the high-vision system is 16:9. This picture is projected by the projection optical system on the projection screen at an equal magnification.

In the case of the embodiment of the present invention shown in FIG. 10B, on the other hand, the ratio of the width Lh' and the height Lv' of the source picture is substantially 1.

Moreover, though the pixel cell is square as shown in FIG. 10A, it is preferred for the pixel cell C' to be vertically long rectangular in proportion to the compression ratio of the source picture as shown in FIG. 10B. When the width Lh' and the height Lv' of the picture in the high-vision system is equal, for instance, the ratio (av/ah) of the vertical length av and the horizontal length ah of the pixel cell should preferably be 16:9 in the shape of a rectangle.

The source picture horizontally compressed is horizontally extended by the system for horizontally extending EXT or EXTM as the optical system for extending a picture to obtain magnified picture on the projection screen SR, the magnified picture having the same aspect ratio as that of the original picture. Moreover, the image of the pixel cell in the form of a vertically long rectangle becomes square when it is projected by the system for horizontal magnifying EXT or EXTM on the projection screen, so that a picture having resolution well balanced vertically and horizontally may displayed.

Although a description has been given of the embodiments of the present invention with the projection display apparatus for color pictures, the present invention is not limited to those described above but applicable to a monochromatic projection display apparatus using one projection cathode-ray tube or a sheet of liquid crystal panel.

As set forth above, according to the present invention, the area of the picture that can be projected by the projection lens systems for magnifying is magnifiable so as to maximize the whole luminous flux in the projection display apparatus using the projection cathode-ray tubes or what uses the liquid crystal panels. In this way, not only the luminance but also the contrast of the picture on the projection screen is improvable.

In addition, the present invention has the effect of reducing the power consumption needed for deflection since the length of horizontal deflection of the electron beam is reducible.

What is claimed is:

1. A projection system for a picture comprising means for generating source pictures, projection optical system means for magnifying the source pictures formed in said means for generating source pictures and for projecting the magnified source pictures, and a projection means for receiving the magnified and projected source pictures from the projection optical system means, the means for generating source pictures forming source pictures so that an aspect ratio of an original picture is varied so as to become substantially closer to 1, and the projection system for magnifying and projecting the source pictures onto the projection means including means for expanding the source pictures so as to expand the aspect ratio of the source pictures projected onto the projection means to an aspect ratio substantially corresponding to the aspect ratio of the original picture.

2. A projection display apparatus comprising projection cathode-ray tubes each having face plate panels, projection optical system means for magnifying and for projecting source pictures formed on the face plate panels of the projection cathode-ray tubes, a projection screen for receiving the projected and magnified source pictures from the projection optical system means, picture compression means for forming source pictures on the face plate panels of the projection cathode-ray tubes so that an aspect ratio of an original picture compressed and is varied so as to become substantially closer to 1, and means for expanding the source pictures formed on the face plate panels and projected onto the projection screen to an aspect ratio substantially corresponding to the aspect ratio of the original picture.

3. A projection display apparatus according to claim 2, wherein the means for expanding pictures includes an optical lens provided on the projection screen side of the projection optical system means.

4. A projection display apparatus according to claim 2, wherein the means for expanding pictures includes a convex mirror provided between the projection optical system means and the projection screen.

5. A projection display apparatus according to claim 2, 3 or 4, wherein the compressing means enables compression of a shape of an electron beam spot on the face plate panel in a direction of compression of the source picture.

6. A projection cathode-ray tube for a projection display apparatus comprising electron beam generation means, a face plate panel, the electron beam generation means generating an electron beam spot on the face plate panel for use in generating a source picture having an aspect ratio which is varied so as to be compressed to an aspect ratio substantially closer to 1, the electron beam spot generating means compressing the electron beam spot on the face plate panel in a direction of compression of the source picture.

7. A projection display apparatus comprising a light source lamp, liquid crystal panels each having a number of pixel cells in the form of a matrix, projection optical system means for projecting and magnifying source pictures formed on the liquid crystal panels, a projection screen for receiving the projected magnified source pictures, picture compression means for forming the source pictures on the liquid crystal panels with an aspect ratio of an original picture which is compressed and varied so as to become substantially closer to and means for expanding the source picture formed on the liquid crystal panel and projected onto the projection screen to an aspect ratio substantially corresponding to the aspect ratio of the original picture.

8. A projection display apparatus according to claim 7, wherein the means for expanding includes an optical lens provided on the projection screen side of the projection optical system means.

9. A projection display apparatus according to claim 7, wherein the means for expanding includes a convex mirror provided between a portion of the projection optical system means and the projection screen.

10. A projection display apparatus according to claim 7, 8 or 9, wherein each of the pixel cells of the liquid crystal panel has a shape which is compressed in the direction of compression of the source picture.

11. A liquid crystal panel for a projection display apparatus comprising means for generating a source picture having an aspect ratio which is compressed and varied so as to become substantially closer to 1, said means for generating including a plurality of pixel cells, each pixel cell having a shape which is compressed in the direction of compression of the source picture.

12. A liquid crystal panel according to claim 11, wherein each pixel cell has a rectangular shape with a pair of sides of a first length and a pair of sides having a second length shorter than the first length, the sides of the pixel cell of the second length being arranged in the direction of compression of the source picture.

* * * * *